United States Patent
Yang et al.

(10) Patent No.: US 10,482,298 B2
(45) Date of Patent: Nov. 19, 2019

(54) INTERACTIVE ELECTRONIC DEVICE

(71) Applicant: PixArt Imaging, Inc., Hsin-Chu County (TW)

(72) Inventors: Shu-Sian Yang, Hsin-Chu County (TW); Yen-Min Chang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 15/638,303

(22) Filed: Jun. 29, 2017

(65) Prior Publication Data

US 2017/0300731 A1 Oct. 19, 2017

Related U.S. Application Data

(63) Continuation-in-part of application No. 14/468,308, filed on Aug. 25, 2014, which is a continuation-in-part of application No. 13/715,985, filed on Dec. 14, 2012, now abandoned.

(30) Foreign Application Priority Data

Dec. 16, 2011 (TW) .............................. 100146931 A

(51) Int. Cl.
*G06K 7/14* (2006.01)
*A63F 13/213* (2014.01)
(Continued)

(52) U.S. Cl.
CPC .......... *G06K 7/1404* (2013.01); *A63F 13/213* (2014.09); *A63F 13/42* (2014.09);
(Continued)

(58) Field of Classification Search
CPC . H04N 5/23203; H04N 5/232; H04N 5/23219
(Continued)

(56) References Cited

U.S. PATENT DOCUMENTS 6,012,961 A * 1/2000 Sharpe, III ............... A63H 3/28
446/175
6,963,425 B1 11/2005 Nair et al.
(Continued)

FOREIGN PATENT DOCUMENTS

JP 2009104426 A 5/2009
TW M258789 U 3/2005
(Continued)

OTHER PUBLICATIONS

Ming-Ching Chou, "Applications and Integrations of Sensing Devices", Sep. 5, 2010, Precision Machinery Research & Development Center, Robotworld, Taichung City, Taiwan.

*Primary Examiner* — Xi Wang
(74) *Attorney, Agent, or Firm* — Hauptman Ham, LLP

(57) ABSTRACT

An interactive electronic device includes an image capture module, a response module and a processing module. The image capture module is for capturing images. The processing module is for generating a first or second command set according to the image and output a control signal. The response module is for driving the interactive electronic device to perform a first continuous reaction corresponding to a specific pattern contained in the image according to the first command set or drive the interactive electronic device to perform a second continuous reaction according to the second command set. The processing module is further for replacing, adding or deleting at least a command in the first command set in a random manner thereby randomly obtaining a new command set.

19 Claims, 8 Drawing Sheets

(51) Int. Cl.
*A63F 13/42* (2014.01)
*A63H 3/28* (2006.01)
*G06F 3/00* (2006.01)

(52) U.S. Cl.
CPC .............. *A63H 3/28* (2013.01); *G06F 3/00* (2013.01); *A63H 2200/00* (2013.01)

(58) Field of Classification Search
USPC ..... 348/77, 169, 213.99; 446/175, 301, 330, 446/390; 382/116, 181, 165, 103
See application file for complete search history.

(56) References Cited

U.S. PATENT DOCUMENTS

| | | | | |
|---|---|---|---|---|
| 7,442,107 | B1* | 10/2008 | Ueda | A63H 11/20 446/175 |
| 2002/0090132 | A1 | 7/2002 | Boncyk et al. | |
| 2003/0174891 | A1 | 9/2003 | Wenzel et al. | |
| 2005/0105769 | A1* | 5/2005 | Sloan | A63H 3/28 382/103 |
| 2008/0065266 | A1* | 3/2008 | Kim | G05D 1/0225 700/245 |
| 2010/0099493 | A1* | 4/2010 | Horovitz | A63H 33/00 463/31 |
| 2010/0105476 | A1 | 4/2010 | Chang | |
| 2010/0310123 | A1 | 12/2010 | Fahn et al. | |
| 2010/0315235 | A1 | 12/2010 | Adegoke et al. | |
| 2012/0083182 | A1 | 4/2012 | Heatherly et al. | |
| 2013/0288563 | A1* | 10/2013 | Zheng | A63H 3/36 446/268 |

FOREIGN PATENT DOCUMENTS

| | | |
|---|---|---|
| TW | 201017597 A | 5/2010 |
| TW | 201044286 A | 12/2010 |

* cited by examiner

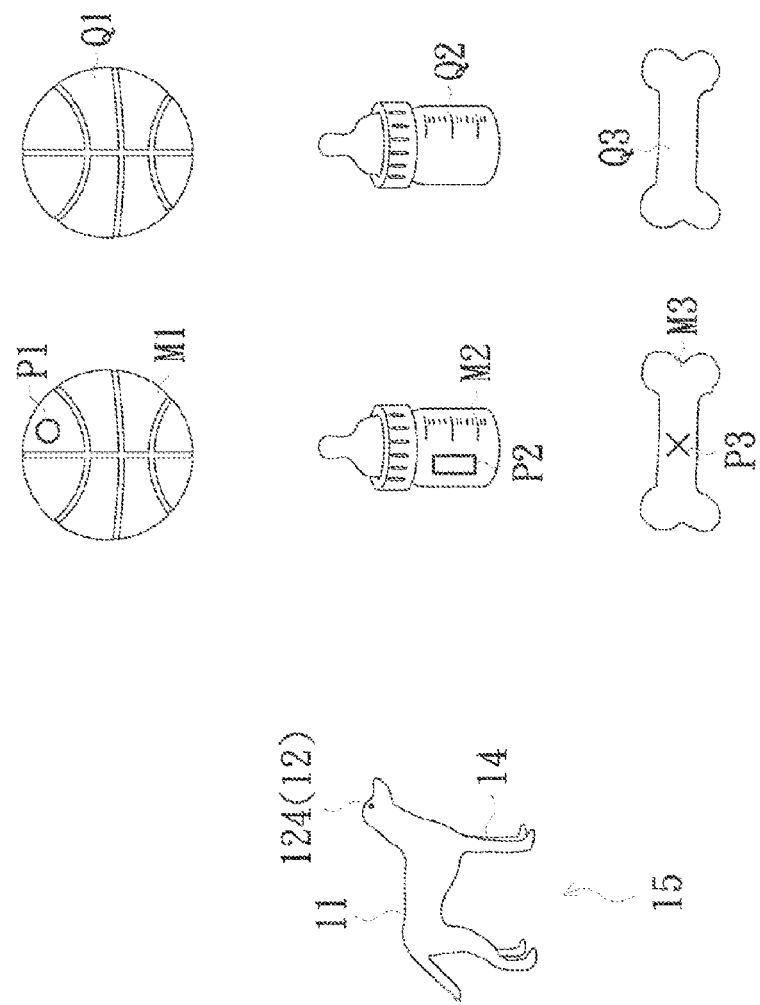

INTERACTIVE ELECTRONIC DEVICE

CROSS-REFERENCE TO RELATED APPLICATIONS

This is a continuation-in-part application of an application Ser. No. 14/468,308, filed Aug. 25, 2014, now pending, which is a continuation-in-part application of an application Ser. No. 13/715,985, filed Dec. 14, 2012, which is based upon and claims the priority benefit from Taiwanese Patent Application No. 100146931 filed Dec. 16, 2011. The entirety of the above-mentioned patent applications are hereby incorporated by reference herein and made a part of this specification.

TECHNICAL FIELD

The present invention relates to an interactive electronic device, and more particularly to an interactive electronic device capable of performing various interactive modes in response to a specific pattern(s) on an image being identified.

BACKGROUND

Toys always are extremely important entertainment products in human life. In recent years, with the advances in electronic technology, videos game technologies are also integrated into the toy designs and thereby causing, due to the modern science elements in the modern toys, some conventional toys have been gradually disappeared.

With the popularity of electronic games, players may not have the best playing experiences if the toy cannot interact with the players; in other words, the interaction relationship between a player and a toy has become a key element to enhance the entertainment.

Therefore, it is desirable to provide an interactive electronic device capable of providing a variety of interactive modes with children or even adults so as to increase the entertainment.

SUMMARY OF EMBODIMENTS

Therefore, one object of the present invention is to provide an interactive electronic device capable of performing various response actions according to a specific pattern contained in a captured image of an object.

The present invention provides an interactive electronic device, which includes an image capture module, a response module and a processing module. Generally the image capture module can be realized as camera for shooting still image or video clips, and the response module comprises hardware to drive the interactive electronic device to perform visual movement and action correspondingly. The image capture module is configured to capture an image. The response module is configured to output a control signal according to a pattern contained in the image. The processing module is electrically connected to the image capture module and the response module and configured to drive the interactive electronic device according to the control signal.

In an embodiment of the present invention, the interactive electronic device further includes at least an accessory. The image capture module is configured to capture an image of each accessory; each accessory includes at least a pattern thereon, and the response module can generate control signals corresponding to different patterns.

In an embodiment of the present invention, the image capture module is configured to identify the pattern contained in the image and accordingly generate identification data. The processing module is configured to output the control signal according to the identification data. The image capture module includes a storage unit, an image capture unit and a processing unit. The storage unit is configured to store with a plurality of characteristic data. The image capture unit is configured to capture the image. The processing unit is electrically connected to the storage unit and the image capture unit and configured to identify at least a characteristic of the image, compare the characteristic(s) with the characteristic data and accordingly generate the identification data.

In an embodiment of the present invention, the processing module is configured to identify the image(s) captured by the image capture module, accordingly generate identification data, and output the control signal according to the identification data. The processing module includes a storage unit and a processing unit electrically connected to the storage unit. The storage unit is configured to store with a plurality of characteristic data. The processing unit is configured to identify at least a characteristic of the image, compare the characteristic(s) with the characteristic data and accordingly generate the identification data.

In an embodiment of the present invention, the image capture module includes an image capture unit and a first processing unit electrically connected to the image capture unit. The image capture unit is configured to capture the image. The first processing unit is configured to search at least a characteristic from the image and transmit the characteristic(s) to the processing module. The processing module includes a storage unit and a second processing unit electrically connected to the storage unit. The storage unit is configured to store with a plurality of characteristic data. The second processing unit is configured to compare the characteristic(s) with the characteristic data so as to determine a type of the specific pattern and control the response module to perform a corresponding response action.

In an embodiment of the present invention, the specific pattern is a barcode or a texture.

In an embodiment of the present invention, the interactive electronic device further includes a main body. The main body is an electronic toy. The response module is disposed in a head and/or limbs of the electronic toy.

In an embodiment of the present invention, the interactive electronic device further includes at least an accessory. The image capture module is configured to capture an image of the accessory. The accessory includes at least a specific pattern thereon functioning as a representative of the accessory. The accessory has a ball-like shape, a bone-like shape or a milk-bottle-like shape.

In an embodiment of the present invention, the image captured by the image capture module is associated with a detection result. The detection result includes a relative position information and a relative position information between the specific pattern and the main body.

The present invention provides an interactive electronic device, which includes an image capture module, a response module and a processing module electrically connected to the image capture module and the response module. The image capture module is configured to capture an image. The processing module is configured to generate a first command set or a second command set according to the image and accordingly output a control signal containing the first command set or the second command set. The response module is configured to drive the interactive electronic device to perform a specific action according to each command in the first command set or the second command set contained in the control signal. The response module is further configured to drive the interactive electronic device to perform a first continuous reaction corresponding to a specific pattern contained in the image according to the first command set or drive the interactive electronic device to perform a second continuous reaction according to the second command set. The processing module is further configured to replace, add or delete at least a command in the first command set in a random manner thereby obtaining the second command set.

In an embodiment of the present invention, the image capture module is configured to identify the pattern contained in the image and accordingly generate identification data, the processing module is configured to generate the first command set or the second command set according to the identification data and accordingly output the control signal.

In an embodiment of the present invention, the image capture module includes a storage unit, an image capture unit and a processing unit. The storage unit is configured to store with a plurality of characteristic data. The image capture unit is configured to capture the image. The processing unit is electrically connected to the storage unit and the image capture unit and configured to identify at least a characteristic of the image, compare the characteristic(s) with the characteristic data and accordingly generate the identification data. The characteristic can be contrast distribution of the image, sum of brightness of the image or portion of the image, such as sum of brightness of row of the image.

In an embodiment of the present invention, the aforementioned interactive electronic device further includes at least one of a battery charge sensor, an ambient brightness sensor, a temperature sensor, a humidity sensor and an electronic clock. The battery charge sensor, the ambient brightness sensor, the temperature sensor, the humidity sensor and the electronic clock are electrically connected to the processing module. The processing module is further configured to replace, add or delete at least a command in the first command set in a random manner thereby obtaining the second command set according to at least a sensing value of the battery charge sensor, a sensing value of the ambient brightness sensor, a sensing value of the temperature sensor, a sensing value of the humidity sensor, a time of the electronic clock and an ambient brightness presented by the image. By the way, the interactive electronic device can perform differently according to environment variation.

In an embodiment of the present invention, the processing module is configured to identify the image(s) captured by the image capture module and accordingly generate identification data, generate the first command set or the second command set according to the identification data and accordingly output the control signal.

In an embodiment of the present invention, the processing module includes a storage unit and a processing unit electrically connected to the storage unit. The storage unit is configured to store with a plurality of characteristic data. The processing unit is configured to identify at least a characteristic of the image, compare the characteristic(s) with the characteristic data and accordingly generate the identification data.

In an embodiment of the present invention, the image capture module includes an image capture unit and a first processing unit electrically connected to the image capture unit. The image capture unit is configured to capture the image. The first processing unit is configured to search at least a characteristic from the image and transmit the characteristic(s) to the processing module. The processing module includes a storage unit and a second processing unit electrically connected to the storage unit. The storage unit is configured to store with a plurality of characteristic data. The second processing unit is configured to compare the characteristic(s) with the characteristic data so as to determine a type of the specific pattern thereby generating the first command set or the second command set.

Generally, the aforementioned unit and module are all electric circuit or software running on an electric circuit to process image and generate signal to move the interactive electronic device.

In summary, due to the processing module can output a control signal according to a specific pattern contained in the image captured by the image capture module and the response module can drive the interactive electronic device according to the control signal, the interactive electronic device of the present invention can perform various response actions in response to objects with various patterns are detected; and thus, the mean for interacting with various objects is realized in the present invention.

BRIEF DESCRIPTION OF THE DRAWINGS

The above embodiments will become more readily apparent to those ordinarily skilled in the art after reviewing the following detailed description and accompanying drawings, in which:

FIG. 1B is a schematic view illustrating an electronic toy, realized by the interactive electronic device, and a number of objects which are configured to interact with the electronic toy;

DETAILED DESCRIPTION OF PREFERRED EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

Figure 1A:
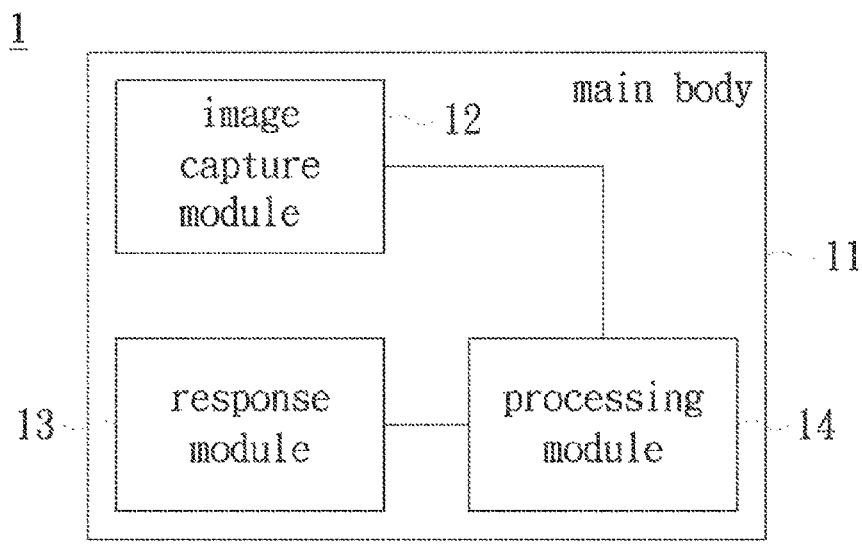
FIG. 1A is a schematic block view of an interactive electronic device in accordance with a first embodiment of the present invention.

FIG. 1A is a schematic block view of an interactive electronic device in accordance with a first embodiment of the present invention. As shown, the interactive electronic device 1 of the present embodiment is configured to perform various response actions in response various objects (not shown) with a specific pattern being detected, so as to realize a function capable of interacting with a plurality of various objects. The interactive electronic device 1 includes an image capture module 12, a response module 13 and a processing module 14; wherein the processing module 14 is electrically connected to the image capture module 12 and the response module 13. In addition, the interactive electronic device 1 may further include a main body 11, in which the image capture module 12, the response module 13 and the processing module 14 are disposed.

Hereafter the main body 11 of the interactive electronic device 1 is exemplified by an electronic toy; however, it is understood that the present invention does not limit the appearance of the main body 11. Moreover, hereafter the main body 11 having the image capture module 12, the response module 13 and the processing module 14 disposed in is also referred to an electronic toy 15 as shown in FIG. 1B.

FIG. 1B is a schematic view illustrating an electronic toy, realized by the interactive electronic device 1, and a number of objects which are configured to interact with the electronic toy. Please refer to FIGS. 1A, 1B. The main body 11 of the electronic toy 15 has, for example but without any limitation, a dog appearance. The image capture module 12 and the response module 13 are disposed in the main body 11; wherein the lens 124 of the image capture module 12 is configured to serve an eye(s) of the electronic toy 15, and the response module 13 can be disposed in the movable parts (for example, a head and/or limbs) of the main body 11.

The image capture module 12 is configured to capture images of a number of various objects. The processing module 14 is configured to output a control signal according to a specific pattern contained in the captured images; in other words, the control signal is associated with the specific pattern contained in the captured image. The response module 13 is configured to drive the interactive electronic device 1 according to the control signal; in other words, the control signal is configured to control the response module 13 to perform a specific response action (for example, control the response module 13 to have a running action) and thereby further driving the electronic toy 15. Thus, the interactive electronic device 1 according to the present embodiment can perform specific response actions when various corresponding objects are detected.

The aforementioned specific pattern can be the overall outline of the appearance of an object; and the object is, for example, a ball (designated by Q1), a milk bottle (designated by Q2) or a bone (designated by Q3). Thus, the interactive electronic device 1 can perform a specific response action when one of the objects Q1, Q2 and Q3 is detected. Or, in another embodiment, the interactive electronic device 1 is configured to perform a specific response action only when a corresponding accessory (for example, the accessories M1, M2 or M3) is detected; wherein the accessories M1, M2 and M3 are designed to be associated with the interactive electronic device 1, and each has a specific corresponding pattern thereon functioning as a representative of the associated accessory. For example, the accessory M1 has a ball-like shape and the pattern P1 thereon is, for example, a circle; and thus, the interactive electronic device 1 can determine that the accessory M1 has a ball-like shape when the pattern P1 (or a circle) is detected. Similarly, the accessory M2 has a milk-bottle-like shape and the pattern P2 thereon is, for example, a square; and thus, the interactive electronic device 1 can determine that the accessory M2 has a milk-bottle-like shape when the pattern P2 (or a square) is detected. Similarly, the accessory M3 has a bone-like shape and the pattern P3 thereon has, for example, an X-like mark; and thus, the interactive electronic device 1 can determine that the accessory M3 has a bone-like shape when the pattern P3 (or an X-like mark) is detected. It is understood that the pattern on the associated accessory in other embodiments is, for example, a barcode or a specific texture; in other words, as long as the pattern is recognizable to the interactive electronic device 1, the present invention does not limit the types of the pattern.

Figure 2:
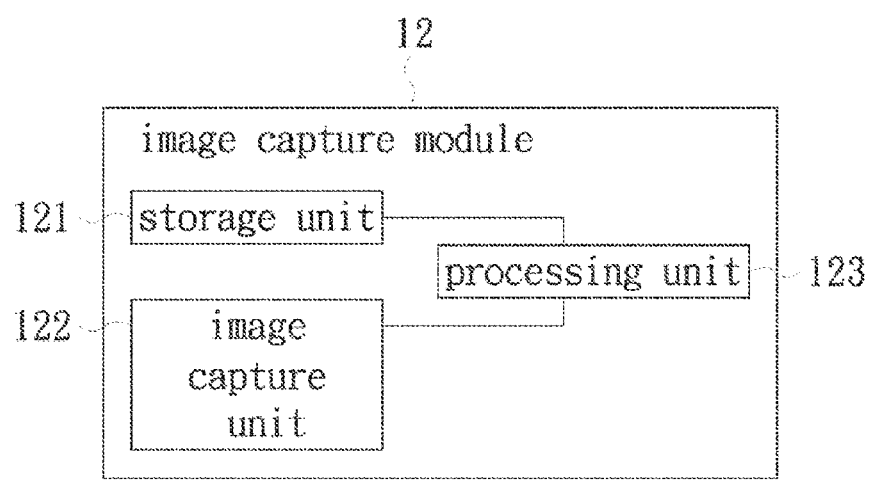
FIG. 2 is a schematic block view of the image capture module in FIG. 1A.

When a player, through an object or an accessory, is interacting with the electronic toy 15, firstly the first electronic toys 15 performs an identification process on the object or the accessory. FIG. 2 is a schematic block view of the image capture module 12, configured to perform the identification process on an object or an accessory, in accordance with the first embodiment of the present invention. As shown, the image capture module 12 includes a storage unit 121, an image capture unit 122 and a processing unit 123; wherein the processing unit 123 is electrically connected to the storage unit 121 and the image capture unit 122.

Identification Process in the First Embodiment

Figure 3A:
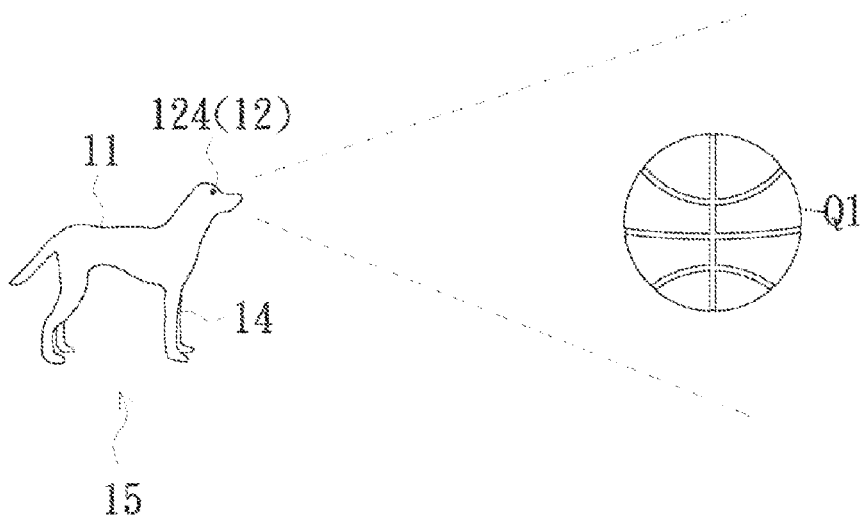
FIGS. 3A, 3B are schematic views illustrating a process of the electronic toy shown in FIG. 1B interacting with an object.

Please refer to FIGS. 2, 3A. The electronic toy 15 is, for example, in a still state before a player interacts with it. The image capture unit 122 of the electronic toy 15 is configured to have a determined detection region; wherein the detection region is designated by the dotted lines as shown in FIG. 3A, and the detection region has, for example but without any limitation, a range of 10 meters.

Figure 3B:
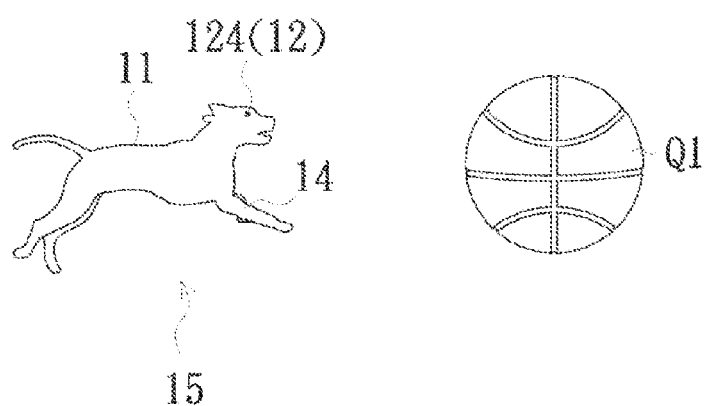

Please refer to FIGS. 2, 3B. Then, the image capture unit 122, usually realized as a small camera installed inside the toy, is configured to capture an image of the object Q1 when the object Q1 is thrown within the detection region of the image capture unit 122 by the player; wherein a detection result, for indicating a relative position information and a relative distance information between the object Q1 and the main body 11, can be derived from this captured image. Next, the image capture unit 122 is configured to transmit the captured image to the processing unit 123 for the identification process. The processing unit 123 is configured to search at least one characteristic contained in the image; wherein the characteristic(s) is, for example, a shape characteristic, a size characteristic or a color characteristic, or, a combination of them. In addition, the characteristic search may be realized by a global characteristic search or a local characteristic search; wherein the local characteristic search is associated with the local binary pattern (LBP) or the Haar pattern, and the global characteristic search is associated with the color histogram pattern.

Afterwards, the processing unit 123 is configured to compare at least one characteristic contained in the captured image of the object Q1 with the characteristic data stored in the storage unit 121 so as to generate identification data; wherein the comparison is realized, for example but without any limitation, by vector inner product.

Accordingly, once the identification data is generated, the processing unit 123 can determine that the object thrown within the detection region of the image capture unit 122 is the object Q1 with a ball-like shape, and also the relative distance information and the relative position information between the object Q1 and the electronic toy 15 are determined. Then, the processing unit 123 is configured to transmit the identification data associated with the object Q1 to the processing module 14. The processing module 14 is configured to generate a control signal according to the identification data and transmit the control signal to the response module 13. Consequently, the response module 13 is configured to control the electronic toy 15 to perform a specific response action according to the control signal. For example, the electronic toy 15 is an electronic toy dog, and the control signal may be configured to drive the four limbs to have a running action so as to drive the electronic toy 15 to chase the ball-like object Q1, meanwhile the camera (i.e. the image capture unit 122) continuously takes images to keep the electronic toy dog chasing the object Q1. Once the electronic toy 15 touches the ball-like object Q1, the image captured by the camera can represent the touch, and the control signal may further drive the response module 13 to perform another specific response action to the object Q1, such as driving the four limbs of the electronic toy 15 to play with the ball. However, to enhance the entertainment, sometimes, by random algorithm, the electronic toy can perform in odd way instead of performing predicted action. For example, the electronic toy can run to the object Q1 once it sees the object by camera, but then suddenly walks away, or kicks the object out. The odd operation is triggered by random algorithm to drive the response module 13 installed inside the electronic toy dog. In some embodiments, the processing unit 123 is a digital signal process (DSP), while the processing module 14 is a microprocessor (MCU), a central processing unit (CPU), an application specific integrated circuit (ASIC) or the like.

Therefore, based on the aforementioned description the interaction between the interactive electronic device 1 and an object is realized. In addition, although the interactive electronic device 1 in the aforementioned description is exemplified by having specific response actions (for example, run, chase and play) with the ball-like object Q1, it is to be noted that the interactive electronic device 1 of the present invention does not limit the interacting object as well as the associated response actions; in other words, the interactive electronic device 1 according to the present embodiment can be configured to perform various response actions according to various types of object.

Figure 4:
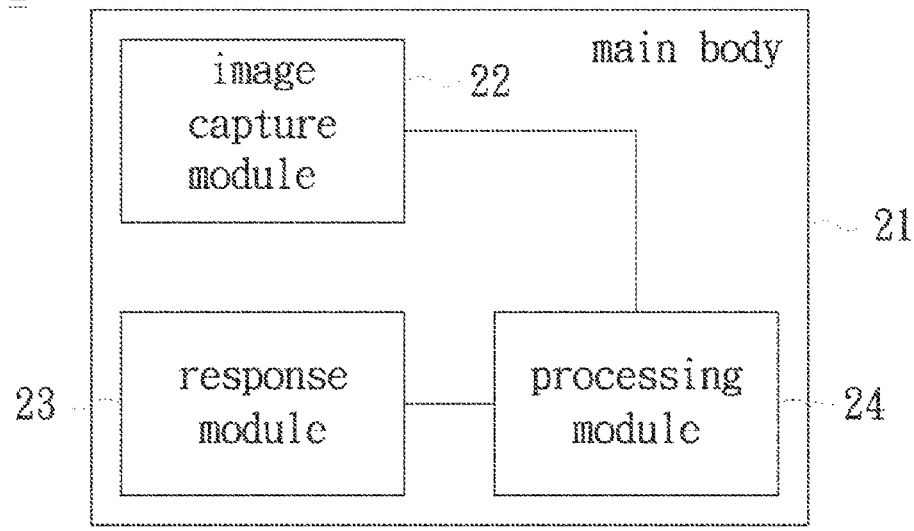
FIG. 4 is a schematic block view of an interactive electronic device in accordance with a second embodiment of the present invention.
Figure 5:
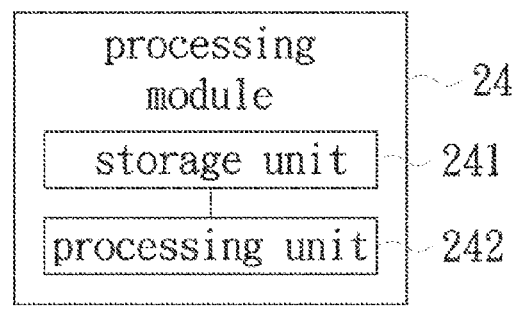
FIG. 5 is a schematic block view of a processing module in FIG. 4.

FIG. 4 is a schematic block view of an interactive electronic device in accordance with a second embodiment of the present invention. FIG. 5 is a schematic block view of a processing module in FIG. 4. As shown, the interactive electronic device 2 includes an image capture module 22, a response module 23 and a processing module 24; wherein the processing module 24 is electrically connected to the image capture module 22 and the response module 23. All these modules are hardware and/or hardware with software or firmware. The hardware comprises such as electronic circuit, mechanism to process electronic signal and perform movement correspondingly. The movement is, for example, configured to let the electronic toy move, jump, run, bend, swing, wave limb, blink, and etc. In addition, the interactive electronic device 2 may further include a main body 21, in which the image capture module 22, the response module 23 and the processing module 24 are disposed. The interactive electronic device 2 according to the present embodiment is similar to the interactive electronic device 1 shown in FIG. 1A, and the main difference between the two is that the image identification is realized by the processing module 24.

The main body 21 and the response module 23 in the present embodiment each have functions similar to that of the main body 11 and the response module 13 of the first embodiment, respectively; and thus no any unnecessary detail will be given here. In particular, the image capture module 22 is configured to capture images of an object (not shown) and transmit the captured images to the processing module 24. The processing module 24 is configured to identify the captured images, generate identification data according to the captured images, and output a control signal according to the identification data. Specifically, the processing module 24 includes a storage unit 241 and a processing unit 242; wherein the processing unit 242 is electrically connected to the storage unit 241. The storage unit 241 is configured to store with a plurality of characteristic data. The processing unit 242 is configured to identify at least one characteristic of the captured image, compare the characteristic(s) with the stored characteristic data so as to generate identification data, and output a control signal corresponding to the identification data to the response module 23. The response module 23 is configured to be driven by the control signal to perform a specific response action. The process of identifying images and the means of generating the identification data are similar to that of the first embodiment; and thus, no any unnecessary detail will be given here.

Figure 6:
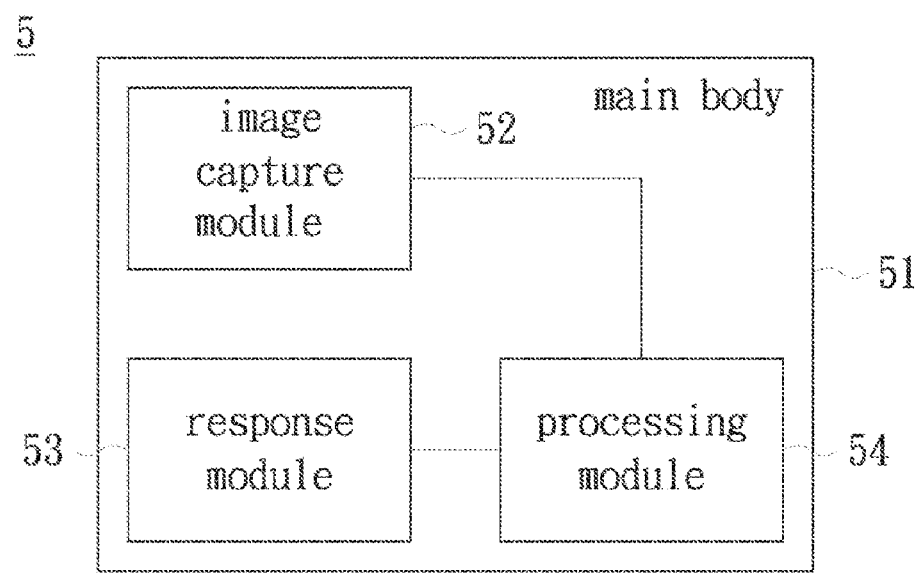
FIG. 6 is a schematic block view of an interactive electronic device in accordance with a third embodiment of the present invention.
Figure 7A:
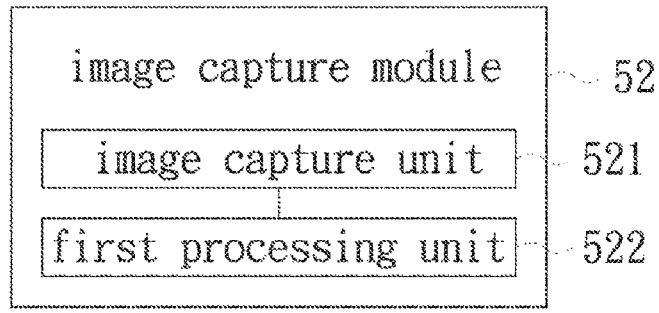
FIG. 7A is a schematic block view of an image capture module in FIG. 6.
Figure 7B:
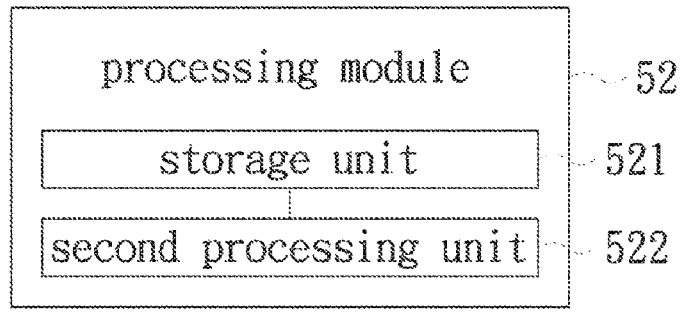
FIG. 7B is a schematic block view of a processing module in FIG. 6.

FIG. 6 is a schematic block view of an interactive electronic device in accordance with a third embodiment of the present invention. FIG. 7A is a schematic block view of an image capture module in FIG. 6. FIG. 7B is a schematic block view of a processing module in FIG. 6. As shown, the interactive electronic device 5 includes an image capture module 52, a response module 53 and a processing module 54; wherein the processing module 54 is electrically connected to the image capture module 52 and the response module 53. In addition, the interactive electronic device 5 may further include a main body 51, in which the image capture module 52, the response module 53 and the processing module 54 are disposed. The interactive electronic device 5 according to the present embodiment is similar to the interactive electronic device 1 shown in FIG. 1A, and the main difference between the two is that the image identification is realized by the image capture module 52 and the processing module 54. That means as long as there is a hardware and software capable of identifying image of object, the hardware and software can be installed in either image capture module or processing module. For example, in this embodiment, the image capture module can be designed to focus on image processing function, and the workload of image identification can be processed by the processing module.

The main body 51 and the response module 53 in the present embodiment each have functions similar to that of the main body 11 and the response module 13 of the first embodiment, respectively; and thus no any unnecessary detail will be given here. Moreover, the image capture module 52 includes an image capture unit 521 and a first processing unit 522; wherein the first processing unit 522 is electrically connected to the image capture unit 521. In particular, the image capture unit 521 is configured to capture images of an object (not shown) and transmit the captured images to the first processing unit 522. The first processing unit 522 is configured to search at least one characteristic from the captured image and transmit the characteristic(s) to the processing module 54; wherein the characteristic(s) in the captured image and the means for searching the characteristic(s) from the captured image are similar to that in the first embodiment, and thus, no any unnecessary detail will be given here. In addition, the processing module 54 includes a storage unit 541 and a second processing unit 542; wherein the second processing unit 542 is electrically connected to the storage unit 541. The storage unit 541 is configured to store with a plurality of characteristic data. The second processing unit 542 is configured to compare the characteristic(s) of the captured image with the characteristic data so as to determine the type of a specific pattern contained in the captured image, and accordingly control the response module 53 to perform a specific response action. The characteristic comparison means are similar to that in the first embodiment; and thus, no any unnecessary detail will be given here.

Figure 8:
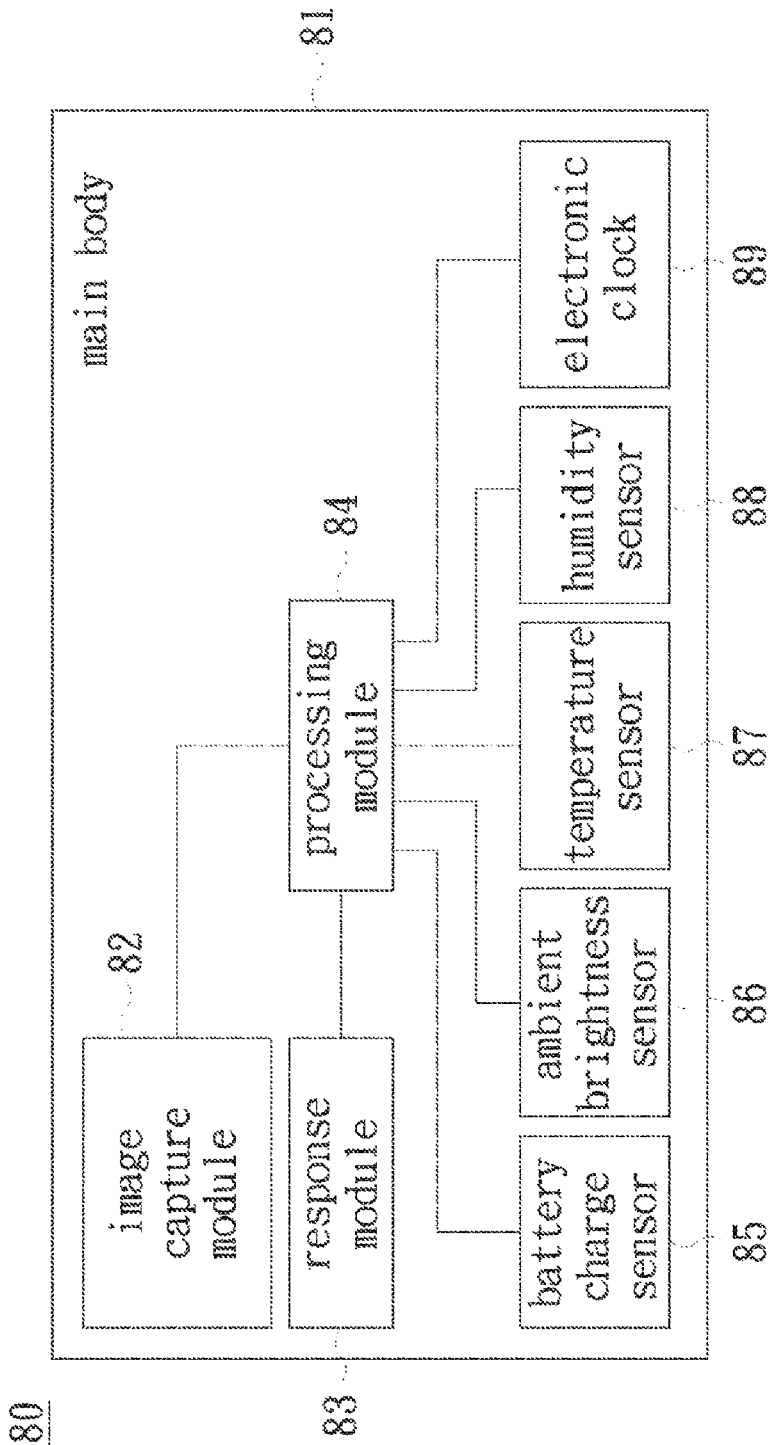
FIG. 8 is a schematic block view of an interactive electronic device in accordance with a fourth embodiment of the present invention.

FIG. 8 is a schematic block view of an interactive electronic device in accordance with a fourth embodiment of the present invention. As shown, the interactive electronic device 80 in the present embodiment includes an image capture module 82, a response module 83 and a processing module 84; wherein the processing module 84 is electrically connected to the image capture module 82 and the response module 83. In the following, a main body 81 having an electronic toy shape is took as an example for illustrating an embodiment of the interactive electronic device 80; however, it is understood that the main body 81 is not limited to having an electronic toy shape in the present invention. As shown, the main body 81 (an electronic toy, for example, a dog) includes the image capture module 82, the response module 83 and the processing module 84. Specifically, the image capture module 82 and the processing module 84 are disposed in the main body 81. The lens of the image capture module 82 may function as the eyes of the main body 81 (an electronic toy, for example, a dog). The response module 83 may be disposed in the movable parts of the main body 81 (an electronic toy, for example, a dog), such as head and legs.

The interactive electronic device 80 in the present embodiment is similar to the interactive electronic device 1 of FIG. 1A. The main difference between the two is that the processing module 84 in the interactive electronic device 80 is configured to generate a first command set or a second command set according to the image captured by the image capture module 82 and accordingly output a control signal containing the first command set or the second command set. In addition, the response module 83 is configured to drive the interactive electronic device 80 to perform a predetermined action according to each command in the first command set or the second command set contained in the control signal. For example, the response module 83 may drive the interactive electronic device 80 to perform a running movement according to one specific command or drive the interactive electronic device 80 to pick up and hold a ball in its mouth according to another specific command.

In the present embodiment, the response module 83 may be further configured to drive the interactive electronic device 80 to perform a first continuous reaction (which is a set including a plurality of predetermined actions) corresponding to a specific pattern contained in the aforementioned image according to the first command set or drive the interactive electronic device 80 to perform a second continuous reaction (which is also a set including a plurality of predetermined actions) according to the second command set. For example, when the image capture module 82 captures an image containing the accessories M1, the processing module 84 may determine that the accessories M1 has a ball shape based on that the specific pattern P1 on the accessories M1 has a circle shape and accordingly generate the first command set. Thus, the response module 83 may drive the interactive electronic device 80 to run for the accessories M1, pick up and hold the accessories M1 in its mouth, and then run back to the original position of the interactive electronic device 80 according to the first command set. Or, when determining that the accessories M1 has a ball shape based on that the specific pattern P1 on the accessories M1 has a circle shape, the processing module 84 may replace, add or delete at least a command in the first command set in a random manner thereby obtaining the second command set. Thus, the response module 83 may drive the interactive electronic device 80 to perform some specific actions, such as running for the accessories M1, playing with the accessories M1, and then run back to the original position of the interactive electronic device 80 according to the second command set. As a result, the interactive electronic device 80 has higher entertainment.

In this embodiment, the image capture module 82 is configured to identify the specific pattern contained in the captured image and accordingly generate identification data. In one embodiment, the image capture module 82 may include a storage unit, an image capture unit and a processing unit, same as the image capture module 12 in FIG. 2. Specifically, the storage unit is stored with a plurality of characteristic data; and the image capture unit is for capturing images. The processing unit is electrically connected to the storage unit and the image capture unit and is configured to identify at least a characteristic of the aforementioned image, compare the characteristic data stored in the storage unit with the characteristic of the image, and accordingly generate the identification data. Thus, the processing module 84 can generate the first command set or the second command set according to the identification data thereby generating the control signal.

Refer to FIG. 8, again. The interactive electronic device 80 may further include at least one of a battery charge sensor 85, an ambient brightness sensor 86, a temperature sensor 87, a humidity sensor 88 and an electronic clock 89. The battery charge sensor 85, the ambient brightness sensor 86, the temperature sensor 87, the humidity sensor 88 and the electronic clock 89 are electrically connected to the processing module 84. Correspondingly, the processing module 84 is further configured to replace, add or delete at least a command in the first command set in a random manner thereby obtaining the second command set according to at least a sensing value of the battery charge sensor 85, a sensing value of the ambient brightness sensor 86, a sensing value of the temperature sensor 87, a sensing value of the humidity sensor 88, a time of the electronic clock 89 and an ambient brightness presented by the image captured by the image capture module 82. As a result, the interactive electronic device 80 has higher entertainment.

More specifically, in the present disclosure, the interactive electronic device 80 previously stores a first command set, which is normally used to control the interactive electronic device 80 to perform a first continuous reaction when the specific pattern is recognized by the interactive electronic device 80, and a second command set, which is randomly used to control the interactive electronic device 80 to perform a second continuous reaction when the specific pattern is recognized by the interactive electronic device 80. If the second command set is not selected, the interactive electronic device 80 only performs the first continuous reaction; and the second continuous reaction is performed only when the second command set is selected. In this way, for a period of time during which the specific pattern is continuously recognizable, the second continuous reaction occurs within only a part of the period of time to cause unexpected reactions, and within the rest part of the period of time the first continuous reaction hosts the operation. And since the second continuous reaction is designed to appear randomly, said a part of the period of time appears at any time interval among the period of time.

In another embodiment of the present invention, the identification data is not generated by the image capture module 82 in the interactive electronic device 80 of FIG. 8 but is generated through the processing module 84 identifying the image captured by the image capture module 82. Consequentially, the processing module 84 generates the first command set or the second command set according to the identification data, and accordingly output the control signal. Thus, in this embodiment, the processing modules 84 may include a storage unit and a processing unit electrically connected to the storage unit, same as the processing module 24 shown in FIG. 5. Specifically, the storage unit is stored with a plurality of characteristic data. The processing unit is configured to identify at least a characteristic of the aforementioned image, compare the characteristic data stored in the storage unit with the characteristic of the image, and accordingly generate the identification data. Thus, the processing module 84 can generate the first command set or the second command set according to the identification data thereby generating the control signal.

In still another embodiment of the present invention, the image capture module 82 in the interactive electronic device 80 of FIG. 8 may include an image capture unit and a first processing unit electrically connected to the image capture unit, same as the image capture module 52 shown in FIG. 7A. Specifically, the image capture unit is configured to capture images. The first processing unit is configured to search at least a characteristic of the aforementioned image and output the searched characteristic to the processing module 84. The processing module 84 in the interactive electronic device 80 of FIG. 8 may include a storage unit and a second processing unit electrically connected to the storage unit, same as the processing module 54 shown in FIG. 7A. Specifically, the storage unit is stored with a plurality of characteristic data. The processing unit is configured to compare the characteristic data stored in the storage unit with the characteristic of the image, determine the type of the aforementioned specific pattern, and accordingly generate the first command set or the second command set.

In summary, due to the processing module can output a control signal according to a specific pattern contained in the image captured by the image capture module and the response module can drive the interactive electronic device according to the control signal, the interactive electronic device of the present invention can perform various response actions in response to objects with various patterns are detected; and thus, the mean for interacting with various objects is realized in the present invention. Moreover, in one embodiment, because the interactive electronic device includes specific accessories each including a specific easy-to-identify pattern thereon, the interactive electronic device can, without a complicated image identification process, perform a response action in response to a specific accessory is detected. In addition, because the image identification process is relatively simpler and can be realized by a low-level processor, the interactive electronic device disclosed in the present invention not only can have a higher response speed, but also can have a lower production cost when a low-level processor is adopted therein.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An interactive electronic device, comprising:
   an image capture module;
   a response module; and
   a processing module electrically connected to the image capture module and the response module; wherein
      the image capture module is configured to capture an image of an object,
      the processing module is configured to generate a first command set according to the image and accordingly output a control signal containing the first command set,
      the response module is configured to drive the interactive electronic device to perform a specific action according to each command in the first command set,
      the response module is further configured to drive the interactive electronic device to perform a first continuous reaction corresponding to a specific pattern contained in the image according to the first command set, and
   wherein the processing module, triggered by a random algorithm installed in the interactive electronic device, further randomly replaces, adds or deletes at least a command in the first command set in operation thereby randomly obtaining a new command set different from the first command set to drive the interactive electronic device to perform unexpected reactions according to the new command set,
   wherein in a period of time during which the specific pattern is continuously recognizable in the image, the interactive electronic device is driven to:
   perform the unexpected reactions according to the new command set within only a part of the period of time, and
   perform the continuous reaction according to the stored command set in the rest of the period of time.

2. The interactive electronic device according to claim 1, wherein the image capture module is configured to capture an image of at least one accessory, each of the at least one accessory comprises at least a pattern thereon functioning as a representative of the associated accessory.

3. The interactive electronic device according to claim 1, wherein
   the image capture module is configured to identify the pattern contained in the image and accordingly generate identification data, and
   the processing module is configured to generate the first command set according to the identification data and accordingly output the control signal.

4. The interactive electronic device according to claim 3, wherein the image capture module comprises:
   a storage storing a plurality of characteristic data; and
   a processing unit electrically connected to the storage, and configured to identify at least a characteristic of the image, compare the characteristic(s) with the characteristic data and accordingly generate the identification data.

5. The interactive electronic device according to claim 4, wherein the characteristic(s) is selected from a group consisting of a shape characteristic, a size characteristic and a color characteristic.

6. The interactive electronic device according to claim 1, further comprising at least one of a battery charge sensor, an ambient brightness sensor, a temperature sensor, a humidity sensor and an electronic clock, wherein the battery charge sensor, the ambient brightness sensor, the temperature sensor, the humidity sensor and the electronic clock are electrically connected to the processing module, the processing module is further configured to replace, add or delete at least a command in the first command set in a random manner thereby randomly obtaining the new command set according to at least a sensing value of the battery charge sensor, a sensing value of the ambient brightness sensor, a sensing value of the temperature sensor, a sensing value of the humidity sensor, a time of the electronic clock and an ambient brightness presented by the image.

7. The interactive electronic device according to claim 1, wherein the processing module is configured to identify the image(s) captured by the image capture module and accordingly generate identification data, generate the first command set according to the identification data and accordingly output the control signal.

8. The interactive electronic device according to claim 7, wherein the processing module comprises a storage and a processing unit electrically connected to the storage,
the storage stores a plurality of characteristic data, and
the processing unit is configured to identify at least a characteristic of the image, compare the characteristic(s) with the characteristic data and accordingly generate the identification data.

9. The interactive electronic device according to claim 8, wherein the characteristic(s) is selected from a group consisting of a shape characteristic, a size characteristic and a color characteristic.

10. The interactive electronic device according to claim 1, wherein
the image capture module comprises a first processing unit configured to search at least a characteristic from the image and transmit the characteristic(s) to the processing module,
the processing module comprises a storage and a second processing unit electrically connected to the storage, the storage stores a plurality of characteristic data, and
the second processing unit is configured to compare the characteristic(s) with the characteristic data so as to determine a type of the specific pattern thereby generating the first command set.

11. The interactive electronic device according to claim 10, wherein the characteristic(s) is selected from a group consisting of a shape characteristic, a size characteristic and a color characteristic.

12. The interactive electronic device according to claim 1, wherein the specific pattern is a barcode or a texture.

13. The interactive electronic device according to claim 1, further comprising a main body, wherein the main body is an electronic toy, the response module is disposed in a head and/or limbs of the electronic toy.

14. The interactive electronic device according to claim 13, wherein the image capture module is configured to capture an image of at least one accessory, the accessory comprises at least a specific pattern thereon functioning as a representative of the accessory, and the accessory has a ball-like shape, a bone-like shape or a milk-bottle-like shape.

15. The interactive electronic device according to claim 1, wherein the image captured by the image capture module is associated with a detection result, the detection result includes a relative position information and a relative position information between the specific pattern and the main body.

16. The interactive electronic device according to claim 1, wherein the part of the period of time is at any time interval among the period of time.

17. An operating method for an interactive electronic device, the interactive electronic device comprising an image capture module, and previously storing a command set for controlling the interactive electronic device to perform a continuous reaction, the operating method comprising:
capturing an image by the image capture module;
recognizing a specific pattern in the image; and
triggered by a random algorithm installed in the interactive electronic device, randomly replacing, adding or deleting at least a command in the command set in operation when the specific pattern is recognized in the image thereby randomly obtaining a new command set different from the stored command set to drive the interactive electronic device to perform unexpected reactions according to the new command set,
wherein in a period of time during which the specific pattern is continuously recognizable in the image, the operating method further comprises:
controlling the interactive electronic device to perform the unexpected reactions according to the new command set within only a part of the period of time, and
controlling the interactive electronic device to perform the continuous reaction according to the stored command set in the rest of the period of time.

18. The operating method according to claim 17, wherein the part of the period of time is at any time interval among the period of time.

19. The operating method according to claim 17, wherein the specific pattern is a barcode or a texture.

* * * * *